United States Patent
Wen

(10) Patent No.: US 12,550,236 B2
(45) Date of Patent: Feb. 10, 2026

(54) MULTIFUNCTIONAL LED DIMMING POWER WITH DIMMING, COLOR ADJUSTMENT AND VOLTAGE ADJUSTMENT FUNCTIONS

(71) Applicant: Zhuhai Shengchang Electronics Co., Ltd., Zhuhai (CN)

(72) Inventor: Guobiao Wen, Meizhou (CN)

(73) Assignee: Zhuhai Shengchang Electronics Co., Ltd., Zhuhai (CN)

( * ) Notice: Subject to any disclaimer, the term of this patent is extended or adjusted under 35 U.S.C. 154(b) by 120 days.

(21) Appl. No.: 18/515,840

(22) Filed: Nov. 21, 2023

(65) Prior Publication Data
US 2024/0224390 A1  Jul. 4, 2024

(30) Foreign Application Priority Data
Jan. 3, 2023  (CN) .......................... 202320004608.6

(51) Int. Cl.
*H05B 45/24*  (2020.01)
*H05B 45/10*  (2020.01)
*H05B 45/20*  (2020.01)

(52) U.S. Cl.
CPC ............. *H05B 45/10* (2020.01); *H05B 45/20* (2020.01)

(58) Field of Classification Search
CPC ......... H05B 45/10; H05B 45/20; Y02B 20/30
See application file for complete search history.

(56) References Cited

U.S. PATENT DOCUMENTS

| | | | |
|---|---|---|---|
| 9,942,959 B1* | 4/2018 | Zheng | H05B 45/3725 |
| 2015/0257216 A1* | 9/2015 | Lys | H05B 45/3725 |
| | | | 315/210 |
| 2017/0311405 A1* | 10/2017 | Sanghvi | H05B 45/10 |
| 2019/0320515 A1* | 10/2019 | Sadwick | F21V 23/0471 |
| 2020/0214097 A1* | 7/2020 | Qiu | H05B 45/24 |
| 2023/0371147 A1* | 11/2023 | Hsu | H05B 45/327 |

* cited by examiner

*Primary Examiner* — Minh Tran
(74) *Attorney, Agent, or Firm* — Nitin Kaushik

(57) ABSTRACT

The present invention provides a multifunctional LED dimming power supply with dimming, color adjustment and voltage adjustment functions. The power supply driver is connected to a first power MOS tube, a second power MOS tube, a voltage regulation circuit, and a dimming and color control module; the dimming and color control module is connected to a voltage regulation circuit, an external dimmer signal collection input circuit, a potentiometer, a mode switching four-shift switch, a first power MOS tube and a second power MOS tube; the first MOS drive circuit is connected to the second power MOS tube; the second MOS drive circuit is connected to the first power MOS tube. The multifunctional dimming power supply provides the PWM dimming, color temperature adjustment and DC dimming functions to satisfy most LED lamps on the market and facilitate users to choose the products while providing a very high price-performance ratio.

4 Claims, 1 Drawing Sheet

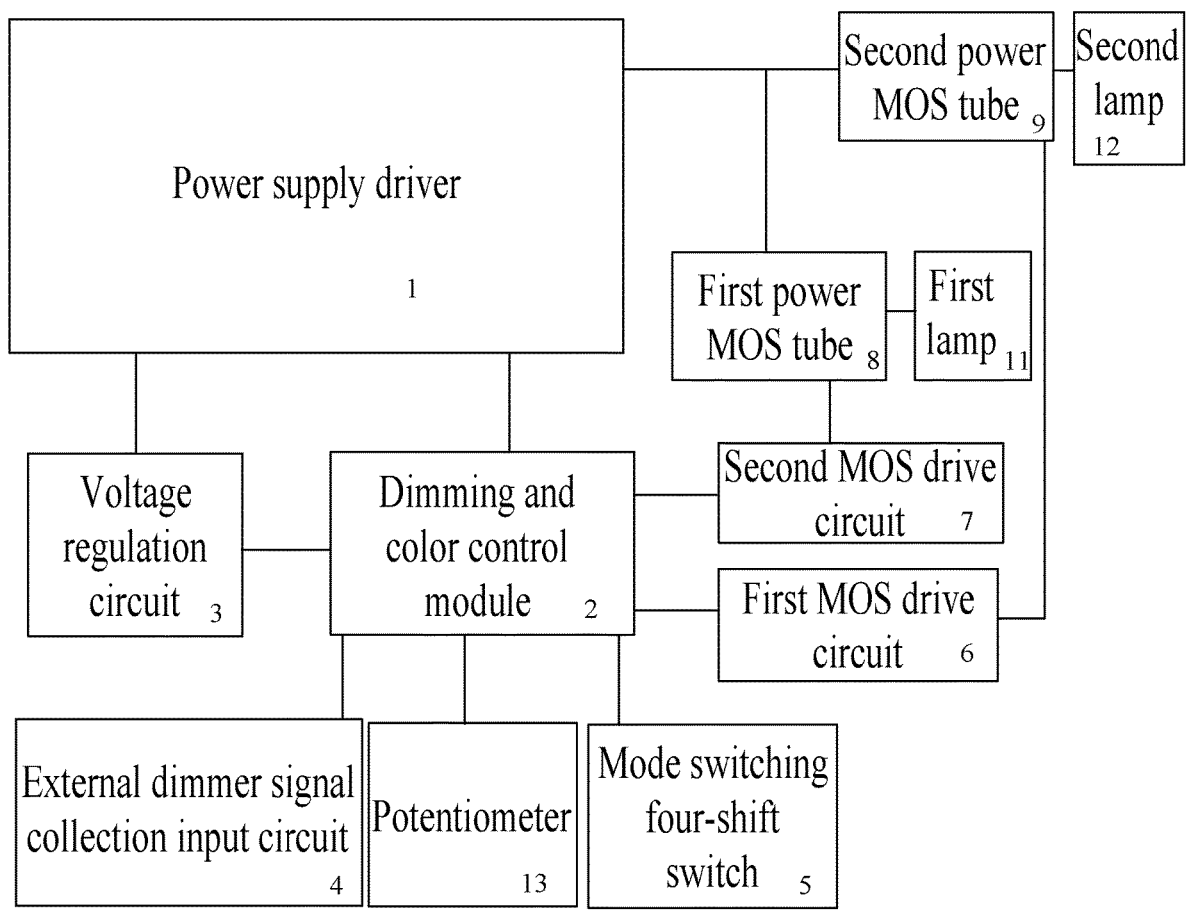

MULTIFUNCTIONAL LED DIMMING POWER WITH DIMMING, COLOR ADJUSTMENT AND VOLTAGE ADJUSTMENT FUNCTIONS

FIELD OF INVENTION

The present invention is related to the technical field of a lamp device, and more particularly related to a multifunctional LED dimming power supply with dimming, color adjustment and voltage adjustment functions.

BACKGROUND OF THE INVENTION

The existing dimming power supply on the market is extremely rich in functionality and comes with a wide variety, which is very good for users who have the dimming or color temperature adjustment needs. However, the users are facing the wide variety of power supply, and how to choose a suitable one while providing a high price-performance ratio has become a difficult problem.

In view of the above difficulties and deficiencies of the prior art, it is necessary to develop a multifunctional dimming power supply with PWM dimming, color temperature adjustment and DC dimming functions in order to facilitate the user's choice of products and while providing a very high price/performance ratio.

SUMMARY OF THE INVENTION

In order to overcome the deficiencies of the prior art, it is a primary objective of the present invention to provide a multifunctional LED dimming power supply with dimming, color adjustment and voltage adjustment functions.

To achieve the above objective, the present invention provides the following solution:

A multifunctional LED dimming power supply with dimming, color adjustment and voltage adjustment functions includes:

a power supply driver, a dimming and color control module, a voltage regulation circuit, an external dimmer signal collection input circuit, a mode switching four-signal status selector switch, a first MOS drive circuit, a second MOS drive circuit, a first power MOS tube, a second power MOS tube and a potentiometer;

The power supply driver is connected to the first power MOS tube, the second power MOS tube, the voltage regulation circuit, and the dimming and color control module; the dimming and color control module is connected to the voltage regulation circuit, the external dimmer signal collection input circuit, the potentiometer, the mode switching four-signal status selector switch, the first power MOS tube and the second power MOS tube; the first MOS drive circuit is connected to the second power MOS tube; and the second MOS drive circuit is connected to the first power MOS tube.

Preferably, the mode switching four-signal status selector switch has a signal status including a DC dimming control mode signal, a PWM dimming control mode signal and a color temperature control mode signal.

Preferably, the first power MOS tube is connected to the first lamp.

Preferably, the second power MOS tube is connected to the second lamp.

Preferably, the external dimmer signal collection input circuit includes a phase-cut signal input subcircuit and a 0-10V signal input subcircuit.

The phase-cut signal input subcircuit and the 0-10V signal input subcircuit are connected to the dimming and color control module.

The specific embodiments of the present invention have disclosed the following technical effects:

The present invention provides a multifunctional LED dimming power supply with dimming, color adjustment and voltage adjustment functions, including: a power supply driver, a dimming and color control module, a voltage regulation circuit, an external dimmer signal collection input circuit, a mode switching four-signal status selector switch, a first MOS drive circuit, a second MOS drive circuit, a first power MOS tube, a second power MOS tube and a potentiometer. The power supply driver is connected to the first power MOS tube, the second power MOS tube, the voltage regulation circuit, and the dimming and color control module; the dimming and color control module is connected to the voltage regulation circuit, the external dimmer signal collection input circuit, the potentiometer, the mode switching four-signal status selector switch, the first power MOS tube and the second power MOS tube; the first MOS drive circuit is connected to the second power MOS tube; and the second MOS drive circuit is connected to the first power MOS tube. The present invention relates to a multifunctional LED dimming power supply simultaneously having the PWM dimming, color temperature adjustment and DC dimming functions. In a specific embodiment, the power supply has three dimming control modes: a DC dimming control mode, a PWM dimming control mode, and a dual color temperature dimming and color control mode to satisfy most of the LED lamps on the market and facilitate users to choose the products while providing a very high price-performance ratio.

BRIEF DESCRIPTION OF THE DRAWING

The technical solutions in the embodiments of the present invention will be clearly and comprehensively described in conjunction with the accompanying drawings in the embodiments of the present invention as follows. Obviously, the described embodiments are only part of the embodiments, but not all embodiments of the present invention. Based on the embodiments in the invention, all other embodiments obtained by those having ordinary skill in the art without making creative efforts shall also fall within the scope of protection of the invention.

FIG. 1 is a schematic circuit block diagram of an embodiment of the present invention embodiment.

BRIEF DESCRIPTION OF NUMERALS USED IN THE DRAWINGS

1-Power supply driver, 2-Dimming and color control module, 3-Voltage regulation circuit, 4-External dimmer signal collection input circuit, 5-Mode switching four-signal status selector switch, 6-First MOS drive circuit, 7-Second MOS drive circuit, 8-First power MOS tube, 9-Second power MOS tube, 11-First lamp, 12-Second lamp, 13-Potentiometer.

Detailed Description of the Preferred Embodiments

The technical solutions in the embodiments of the present invention will be clearly and completely described below in conjunction with the accompanying drawings in the embodiments of the invention, and it is clear that the described embodiments are only a part of the embodiments of the invention and not all of the embodiments. Based on the embodiments of the invention, all other embodiments obtained by the person having ordinary skill in the art without making creative labor are within the scope of protection of the invention.

The term "embodiment" mentioned in this specification herein means that a particular feature, structure, or characteristic described together with an embodiment may be included in at least one embodiment of the present application. The presence of the term "embodiment" at various parts of the specification does not necessarily refer to the same embodiment, nor is it a separate or alternative embodiment that is mutually exclusive of other embodiments. It is understood by those skilled in the art, both explicitly and implicitly, that the embodiments described herein may be combined with other embodiments.

The terms "first", "second", "third", "fourth", etc. in the specification, claims and accompanying drawings of the present application are used to distinguish between different objects and are not intended to describe a particular order. In addition, the terms "comprises" and "has", and any of their variations are intended to cover non-exclusive inclusion. For example, the inclusion of a series of steps, processes, methods, devices, etc. is not limited to the listed steps, processes, methods, devices, etc., but optionally includes the steps, processes, methods, devices etc. that are not listed, or optionally includes other steps, processes, methods, devices etc. that are inherent to those listed.

It is an objective of the present invention to provide a multifunctional LED dimming power supply with dimming, color adjustment and voltage adjustment functions that can satisfy most of the LED lamps on the market and facilitate users to choose the products while providing a very high price-performance ratio.

The objective, characteristics and advantages of the present invention will become apparent in the following detailed description of the preferred embodiments with reference to the accompanying drawings.

With reference to FIG. 1 for the schematic circuit block diagram of an embodiment of the present invention, the present invention provides a multifunctional LED dimming power supply with dimming, color adjustment and voltage adjustment functions. Firstly, the power supply driver 1 is powered on, the dimming and color control module 2 starts operating, samples, identifies and detects the signal status of the mode switching four-signal status selector switch 5, and then executes the determination of the dimming control mode for one time. When the signal status of the mode switching four-signal status selector switch 5 is detected to be in a DC dimming control mode signal for ten consecutive times, the dimming and color control module 2 will switch the dimming control mode to a dimming control mode. Similarly, when the signal status of the mode switching four-signal status selector switch 5 is detected to be in a PWM dimming control mode signal for ten consecutive times, the dimming and color control module 2 will switch the dimming control mode to a PWM dimming control mode. Similarly, when the signal status of the mode switching four-signal status selector switch 5 is detected to be in a color temperature control mode signal, the dimming and color control module 2 will switch the dimming control mode to a color temperature adjustment control mode. After the dimming and color control module 2 has determined the dimming control mode, the shift element status of the mode switching four-signal status selector switch 5 is changed during the power-on retention period, and the determined dimming control mode will not be changed until the power is turned off, shut down, and turned on again. The above steps are repeated.

Further, after the power supply is switched to the color temperature adjustment control mode, during the same power-on retention period, the signal status of the mode switching four-signal status selector switch 5 is switched to the color temperature selection mode. At this time, a maximum color temperature value can be adjusted and selected through the adjustment by the potentiometer 13.

Further, when the signal status of the mode switching four-signal status selector switch 5 is not in the color temperature selection mode, the voltage outputted by the power supply can only be fine-tuned through the adjustment by the potentiometer 13.

Further, when the power supply operates in the DC dimming control mode, it follows the dimming curve of the DC dimming, where the dimming and color control module 2 outputs a 100% PWM signal to the first MOS drive circuit 6 and the second MOS drive circuit 7 and completely and electrically conducts the first power MOS tube 8 and the second power MOS tube 9. At this time, the brightness of the first lamp 11 or the second lamp 12 is adjusted and controlled by the voltage regulation circuit 3. The dimming and color control module 2 collects and analyzes the signal status of the external dimmer signal collection input circuit 4, and outputs the control signal to the voltage regulation circuit 3, and then the voltage regulation circuit 3 drives the power supply driver 1 to change the voltage of the power supply, so as to realize the change of brightness of the first lamp 11 or the second lamp 12 within the range of 0%-100%.

Further, when the power supply operates at the PWM dimming control mode, it follows the dimming curve of the PWM dimming control method, where the voltage regulation circuit 3 outputs a voltage signal of the maximum brightness, and the brightness of the second lamp 12 and the brightness of the first lamp 11 are adjusted and controlled by the first MOS drive circuit 6 and the second MOS drive circuit 7 respectively. The external dimmer signal collection input circuit 4 transmits the collected dimming signal to the dimming and color control module 2. When the dimming and color control module 2 receives the dimming signal, it outputs a PWM signal of the adjusted brightness to the first MOS drive circuit 6 and the second MOS drive circuit 7 after calculation and processing, and then the first MOS drive circuit 6 and the second MOS drive circuit 7 respectively and electrically conduct the second power MOS tube 9 and the first power MOS tube 8, and change the brightness of the first lamp 11 and the brightness of the second lamp 12 within a range of 0%-100%.

Further, when the power supply operates in a dual color temperature dimming and color control mode, it follows the dimming curve of the dual color temperature dimming and color control mode, where the voltage regulation circuit 3 outputs a voltage signal of the maximum brightness, and the brightness and color temperature change of the dual color temperature lamp are adjusted and controlled by the first MOS drive circuit 6 and the second MOS drive circuit 7 respectively. The dimming curve of the dual color temperature dimming and color control mode is a nonlinear curve with two sections intersected with each other, where the first MOS drive circuit 6 controls a cold light channel, the second MOS drive circuit 7 controls a warm light channel, the curve for the cold light channel is a nonlinear curve with a change of 0%-100%, and the curve for the warm light channel is a nonlinear curve with a change of 0%-40%-0%. When the dual color temperature lamp is exactly situated in a totally cold light state, the first MOS drive circuit 6 outputs 90% of the PWM drive signal, the second MOS drive circuit 7 outputs a 0% PWM drive signal, When the first MOS drive circuit 6 and the second MOS drive circuit 7 output a 36.5% PWM drive signal at the same time, the dual color temperature lamp is situated in a uniform cold land warm light interphase state. When the second MOS drive circuit 7 outputs a 18.5% PWM drive signal, and the first MOS drive circuit 6 outputs a 0% PWM drive signal, the dual color temperature lamp is situated in a totally warm light state.

The operation principle of the present invention is as follows:

Firstly, L and N terminals are connected to the utility power. After the utility power is passed through the AC filter circuit, the power is rectified to DC full wave voltage by a rectifier bridge, and then the DC full wave voltage is further filtered by the DC filter circuit before entering into the power factor correction circuit for boost filtering, and then entered into the power drive circuit for further control. After the controlled voltage enters the primary winding of the transformer, it is coupled to the secondary winding of the transformer to form a low-voltage DC voltage, and the low-voltage DC voltage is further filtered by the DC filter circuit to form a smoother DC voltage, which is outputted through an OUTPUT terminal.

The auxiliary power supply circuit is responsible for dimming a constant voltage circuit and a constant current circuit, and supplying power to the circuit modules such as the dimming, color adjustment and short-circuit protection control circuit and the dimming and color control module to ensure stable operation of each module. The external dimmer signal collection input circuit 4 includes a phase-cut signal input circuit and a 0-10V signal input circuit, where the phase-cut signal input circuit is responsible for transmitting a phase-cut signal of the external phase-cut dimmer to the dimming and color control module; the 0-10V signal input circuit is responsible for transmitting an external 0-10V signal to the dimming and color control module; the constant voltage and constant current circuits are responsible for the functions of outputting constant voltage from the power supply and maintaining constant current to protect the power supply from overload current; the dimming, color adjustment, and short-circuit protection control circuit is responsible for providing a short-circuit protection effect when the output terminal of the power supply is short-circuited and receiving a control signal from the dimming and color control module for joint adjustment control; and the dimming and color control module is the brain of the entire power supply and responsible of collecting and analyzing external dimming and color adjustment signals and outputting the joint control signal to each module of the power supply.

Specifically, after the power supply is powered on, the dimming and color control module will first detect the switch status of the mode switching four-signal status selector switch 5 of the power supply to determine the current dimming or color control mode. After the control mode is determined, the dimming and color control module will enter into the corresponding operating mode and continue detecting the phase-cut signal of the external phase-cut dimmer, the external 0-10V signal, and the fine-tuned signal of the potentiometer 13. When a change of the dimmer signal is detected, the dimming and color control module will drive and output a PWM signal corresponding to the change to a dimming, color adjustment and short-circuit protection control circuit for the operations of dimming and color adjustment.

The embodiments in this specification are described in an incremental manner, each embodiment focuses on the differences with the other embodiments, and same or similar parts between the embodiments are provided for mutual reference.

While the principle and implementation method of the invention are described in some detail hereinbelow with reference to certain illustrated embodiments, it is to be understood that these embodiments are only intended for helping to understand the methodology of the present invention and its core ideas; there is no intent to limit the scope of the invention. To the contrary, it is intended to cover various modifications, alternatives and equivalents, and the scope of the appended claims therefore should be accorded the broadest interpretation so as to encompass all such modifications and similar arrangements and procedures. In summary, the contents of this document should not be construed as a limitation of the present invention.

What is claimed is:

1. A multifunctional LED dimming power supply with dimming, color adjustment and voltage adjustment functions, comprising:
    a power supply driver, a dimming and color control module, a voltage regulation circuit, an external dimmer signal collection input circuit, a mode switching four-signal status selector switch, a first MOS drive circuit, a second MOS drive circuit, a first power MOS tube, a second power MOS tube and a potentiometer;
    wherein, the power supply driver is coupled to the first power MOS tube, the second power MOS tube, the voltage regulation circuit, and the dimming and color control module; the dimming and color control module is coupled to the voltage regulation circuit, the external dimmer signal collection input circuit, the potentiometer, the mode switching four signal status selector switch, the first power MOS tube and the second power MOS tube; the first MOS drive circuit is coupled to the second power MOS tube; and the second MOS drive circuit is coupled to the first power MOS tube;
    wherein signal status of the mode switching four signal status selector switch comprises: a DC dimming control mode signal, a PWM dimming control mode signal, and a color temperature control mode signal
    after the power supply is switched to the color temperature adjustment control mode, during the same power-on retention period, the signal status of the mode switching four-signal status selector switch is switched to the color temperature selection mode; at this time, a maximum color temperature value can be adjusted and selected through the adjustment by the potentiometer;
    when the signal status of the mode switching four-signal status selector switch is not in the color temperature selection mode, the voltage outputted by the power supply can only be fine-tuned through the adjustment by the potentiometer.

2. The multifunctional LED dimming power supply with dimming, color adjustment and voltage adjustment functions according to claim 1, wherein the first power MOS tube is coupled to a first lamp.

3. The multifunctional LED dimming power supply with dimming, color adjustment and voltage adjustment functions according to claim 1, wherein the second power MOS tube is coupled to a second lamp.

4. The multifunctional LED dimming power supply with dimming, color adjustment and voltage adjustment functions according to claim 1, wherein the external dimmer signal collection input circuit comprises a phase-cut signal input subcircuit and a 0-10V signal input subcircuit, which are coupled to the dimming and color control module.

* * * * *